A. J. TENOW & C. E. ANDERSSON.
MEANS FOR PLACING TIMBER IN POSITION FOR SAWING.
APPLICATION FILED APR. 3, 1911.
1,043,169.
Patented Nov. 5, 1912.
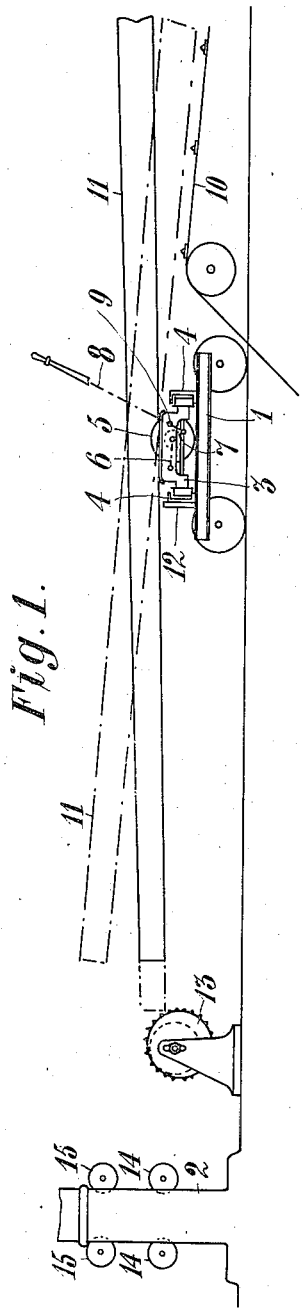
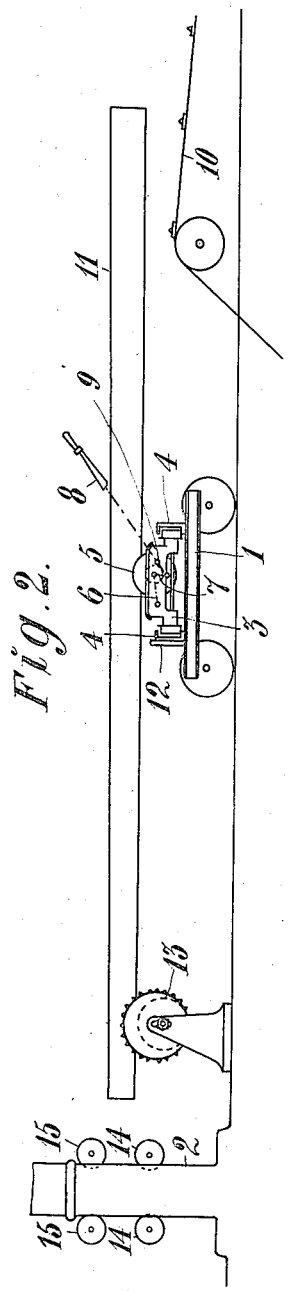
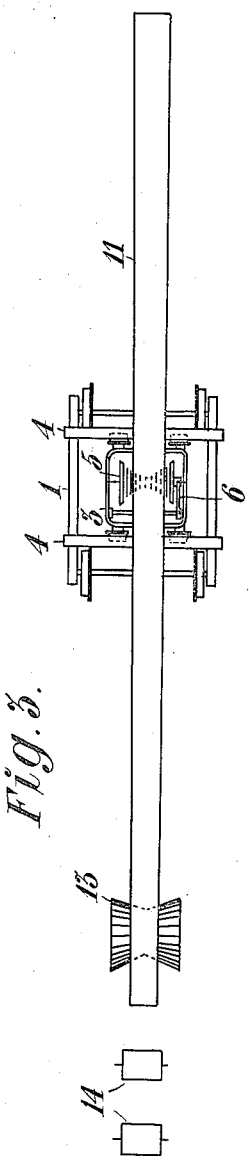

UNITED STATES PATENT OFFICE.

ADOLF JULIUS TENOW AND CARL ERIK ANDERSSON, OF STOCKHOLM, SWEDEN, ASSIGNORS TO J. & C. G. BOLINDERS MEKANISKA VERKTADS AKTIEBOLAG, OF STOCKHOLM, SWEDEN.

MEANS FOR PLACING TIMBER IN POSITION FOR SAWING.

1,043,169.   Specification of Letters Patent.   Patented Nov. 5, 1912.

Application filed April 3, 1911. Serial No. 618,603.

*To all whom it may concern:*

Be it known that we, ADOLF JULIUS TENOW and CARL ERIK ANDERSSON, subjects of the King of Sweden, residing at Stockholm, in the Kingdom of Sweden, have invented new and useful Improvements in Means for Placing Timber in Position for Sawing, of which the following is a specification, reference being had to the drawings accompanying and forming a part hereof.

This invention relates to means for placing timber in position for sawing.

The object of the invention is to enable a single workman to easily adjust the timber vertically and laterally so as to cause it to enter between the feed- and pressure-rollers of the sawing machine in a position suitable for sawing.

The invention consists, chiefly, in this that the timber-conveying means used for feeding the timber toward the sawing machine is placed just in line with the track in front of the saw-blades and supplies the timber directly to a support movable along the said track, said support suitably consisting of a roller mounted on a carriage running on the said track. Placed in front of the said supporting roller, counted in the direction of movement of the timber, preferably on the carriage carrying the said roller, is a further support. When the timber bearing on the supporting roller has been fed forward by the conveyer into a position in which the front end of the timber weighs down about its fulcrum on the roller, the timber will be lying on the roller and the support in front thereof and may be transported by the carriage toward the saw-blades. The supporting roller is adjustable both vertically and laterally and preferably ruffled or otherwise so arranged that the timber lies steadily thereon. By these means the timber may be easily swung or moved in the horizontal or in the vertical plane, as may be desired.

The invention further comprises the construction and combination of parts hereinafter more particularly set forth.

In the drawings, we have shown a suitable embodiment of our invention.

Figure 1 is a side-view of the whole system of contrivances with the timber in two positions, the dotted lines showing the timber moved by the conveyer over the supporting roller, while in the position of the timber shown in full lines the forward or top-end of the timber has weighed down so as to cause the rear or butt-end of the timber to leave the conveyer. Fig. 2 shows the same parts with the timber raised and adjusted in position for sawing. Fig. 3 is a plan view of the same parts. Fig. 4 is a rear view, on an enlarged scale, of a modified contrivance for raising the supporting roller and adjusting it laterally. Fig. 5 is a plan-view of the same parts. Fig. 6 is a side elevation and partial section thereof. Fig. 7 shows a detail.

Referring first to Figs. 1-3, the truck or carriage 1 is movable on rails toward and away from the frame 2 of the sawing machine. Attached to the frame of the said carriage are two rails 4, and movable therein, in a direction at right angles to the track, is a traversing carriage 3. Journaled in the said traversing carriage is a roller 5, preferably in the shape of a double cone grooved in the manner shown in Fig. 4. The pivot pins of the roller 5 are supported by one or more arms 6 pivoted at one end to the frame 3. Said pivot pins are also connected by links 7 to a lever 8 adapted to turn about a fixed point 9.

The timber supplied by the conveyer 10 enters with its forward end on the roller 5 and is fed forward on the same until the center of gravity of the timber is somewhat in front of the roller. The top-end of the roller then weighs down so that the timber will bear on a further support 12 placed in front of the roller 5. When the timber is in this position, the carriage 1 is moved forward by hand or otherwise. During this movement the top-end of the timber meets a support, preferably a roller 13 of such a shape and otherwise so arranged as to automatically engage the timber and guide it into a predetermined position in front of the set of saws, preferably just before the middle plane thereof. When the timber has thus been firmly supported at its forward end, the roller 5 is adjusted vertically by means of the lever 8 so that the timber will take up a substantially horizontal position. Thereupon the traversing carriage 3 is adjusted so as to cause the timber to take up the proper position for sawing. When the timber has been thus placed in position, the carriage 1 is moved forward by hand or otherwise so that the timber is caused to enter between the feed- and pressure-rollers 14, 15 of the sawing machine.

In the modified form of the roller-supporting means shown in Figs. 4–7, the raising of the timber is performed automatically. The axle 18 of the roller 5 is journaled in two arms 16 adapted to swing about a shaft 17. The axle 18 carries two cog-wheels 19 and 20 coöperating with corresponding cog-wheels 21 and 22 on the shaft 17. The wheel 21 may be locked in position by means of a pawl 23 (Fig. 6) pivotally attached to the frame 3. The pawl 23 may be disengaged from the wheel 21 by means of a block 24 attached to an arm 25 adapted to swing about the shaft 17. When the arm is turned, the block 24 acts on the pawl 23 so as to disengage the wheel. The axle 18 is further connected by means of a link 26 to a lever 27 adapted to turn about a pivot pin 28 attached to the frame 3. The lever 27 is provided with a friction block 29 adapted to engage a part 30 which is concentric to the pivot pin 28. The roller 5 is divided at the middle into two conical parts 5 and 5' the latter of which is firmly connected to the cog-wheel 20. The cog-wheel 22 engaging the same also engages a pinion 31 of such a length as to maintain the said engagement, when the frame 3 is moved laterally. The pinion 31 further engages a cog-wheel 32 attached to a shaft 33 carrying a double pulley 34. This pulley coöperates with two lines or ropes 35, 36 running in opposite directions. Placed at the side of the lines or ropes opposite the pulley 34 are two rolls 37, 38 each corresponding to one rope, said rolls being journaled on a cross-piece 39 attached to an axle or shaft 40 and adapted to be swung in opposite directions by means of a lever 41 attached to the said shaft. When the lever 41 is swung in one or the other direction, one of the rollers 37, 38 is pressed onto its line or rope 35 or 36, which is thereby pressed against the pulley 34 so as to rotate the same. If the lever 41 is swung in the opposite direction, the line or rope moving in the opposite direction will be pressed against the pulley 34 which is thereby caused to rotate in the opposite direction. The rotary movement of the pulley 34 is transmitted by the cog-wheel 32, the pinion 31, the cog-wheel 22 and the cog-wheel 20 to the part 5' of the timber-supporting roller. As shown in Figs. 4 and 5, this part of the roller is provided with oblique threads acting, during the rotation of the said part of the roller, like a screw-wheel on the timber so as to turn the same in one or the other direction into position for sawing.

The contrivance last described works as follows: The timber placed in the manner described on the rollers 5 and 13 is moved toward the saw-blades, as shown in Fig. 2, and thereupon turned in the manner described by swinging the lever 41 forward or backward in the longitudinal direction of the timber. Thereupon the carriage 1 is moved forward by hand or otherwise so as to cause the top-end of the timber to enter between the rollers 14 and 15 of the sawing machine. When the timber has been firmly engaged by the rollers 14 and 15 so as to be fed forward by the same, the workman seizes the lever 27 and pulls it backward, i. e. in the direction of the arrow shown in Fig. 6. The carriage is thereby checked, and as the timber is moved forward at a constant speed, it acts to turn the roller 5 with the pinion 19 in the direction of the arrow (Fig. 6), by which the pinion 19 is caused to climb the cog-wheel 21 locked in position by the pawl 23. The roller 5 with the timber thereon is thus raised. When the timber is in proper position, the workman releases the lever 27 which then swings forward under the action of the weight of the timber until the friction block 29 engages the part 30 and retains the roller 5 in its raised position. The lateral adjustment of the timber is easily performed by moving the frame 3 in one or the other direction.

We claim:

1. In a machine for sawing timber, the combination of a set of saws, a track extending in front of the said saws, a carriage movable on the said track, a timber-supporting roller mounted on the said carriage, and a timber conveyer placed in line with the said track, substantially as and for the purpose set forth.

2. In a machine for sawing timber, the combination of a set of saws, a track extending in front of the said saws, a carriage movable on the said track, a timber-supporting roller adjustably mounted on the said carriage, and a timber conveyer placed in line with the said track, substantially as and for the purpose set forth.

3. In a machine for sawing timber, the combination of a set of saws, a track extending in front of the said saws, a carriage movable on the said track, a vertically and laterally adjustable roller mounted on the said carriage, and a timber conveyer placed in line with the said track, substantially as and for the purpose set forth.

4. In a machine for sawing timber, the combination of a set of saws, a track extending in front of the said saws, a carriage movable on the said track, a traverser movable on the said carriage, in a direction at right angles to the direction of movement of the same, a timber-supporting roller mounted on the said traverser, and a timber conveyer placed in line with the said track, substantially as and for the purpose set forth.

5. In a machine for sawing timber, the combination of a set of saws, a track extending in front of the said saws, a carriage movable on the said track, a traverser movable on the said carriage, in a direction at right angles to the direction of movement of the same, a vertically adjustable roller mounted on the said traverser, and a timber conveyer placed in line with the said track, substantially as and for the purpose set forth.

6. In a machine for sawing timber, the combination of a set of saws, a track extending in front of the said saws, a carriage movable on the said track, a traverser movable on the said carriage, in a direction at right angles to the direction of movement of the same, a shaft carried by the said traverser, a gear-wheel loosely mounted on the said shaft, means for locking the said gear-wheel in position, arms adapted to swing about the said shaft, a roller journaled in the said arms, and a gear-wheel connected to the said roller, said latter gear-wheel engaging the former, substantially as and for the purpose set forth.

7. In a machine for sawing timber, the combination of a set of saws, a track extending in front of the said saws, a carriage movable on the said track, a timber-supporting roller mounted on the said carriage, said roller consisting of two separate conical parts with their tops facing each other, one of said parts being provided with threads adapted to engage the timber, and means for turning the said part of the said roller in either direction, substantially as and for the purpose set forth.

8. In a machine for sawing timber, the combination of a set of saws, a track extending in front of the said saws, a carriage movable on the said track, a timber-supporting roller mounted on the said carriage, said roller consisting of two separate conical parts with their tops facing each other, one of said parts being provided with threads adapted to engage the timber, a pulley for turning the said part of the said roller in either direction, connections between the said pulley and the said roller part, movable lines adapted to be pressed against the said pulley for rotating the same in either direction, and means for pressing either line against the said pulley, substantially as and for the purpose set forth.

In testimony whereof we subscribe our names in the presence of two subscribing witnesses.

ADOLF JULIUS TENOW.
CARL ERIK ANDERSSON.

Witnesses:
  AUG. SÖRENSEN,
  GEO. NIEHKURL.